US009746345B2

(12) United States Patent
Baumann et al.

(10) Patent No.: US 9,746,345 B2
(45) Date of Patent: Aug. 29, 2017

(54) APPARATUS AND METHOD FOR DETERMINING A ROTATION ANGLE OF A ROTOR

(71) Applicant: Micronas GmbH, Freiburg (DE)

(72) Inventors: Marc Baumann, Freiburg (DE); Redouane Sadeq, Karlsruhe (DE)

(73) Assignee: TDK-Micronas GmbH, Freiburg (DE)

( * ) Notice: Subject to any disclaimer, the term of this patent is extended or adjusted under 35 U.S.C. 154(b) by 132 days.

(21) Appl. No.: 14/886,059

(22) Filed: Oct. 18, 2015

(65) Prior Publication Data

US 2016/0109264 A1   Apr. 21, 2016

(30) Foreign Application Priority Data

Oct. 17, 2014   (DE) .................. 10 2014 115 179

(51) Int. Cl.
- *G01B 7/30* (2006.01)
- *G01D 5/14* (2006.01)
- *G01D 5/244* (2006.01)
- *G01D 18/00* (2006.01)

(52) U.S. Cl.
CPC .......... *G01D 5/145* (2013.01); *G01D 5/2448* (2013.01); *G01D 18/004* (2013.01)

(58) Field of Classification Search
CPC ........ G01D 18/00; G01D 18/004; G01D 5/14; G01D 5/145; G01D 5/2448
USPC ............... 324/173–174, 202, 225; 310/68 B; 318/400.37, 400.13–400.15
See application file for complete search history.

(56) References Cited

U.S. PATENT DOCUMENTS

| | | | | |
|---|---|---|---|---|
| 5,198,738 A | * | 3/1993 | Blaser | G01P 3/486 250/231.18 |
| 5,493,219 A | * | 2/1996 | Makino | G01D 1/12 324/174 |
| 6,249,094 B1 | * | 6/2001 | Zeh | H02P 6/182 318/400.02 |
| 6,279,375 B1 | | 8/2001 | Draxelmayr | |
| 2014/0225596 A1 | * | 8/2014 | Nakamura | G01R 33/07 324/207.2 |

FOREIGN PATENT DOCUMENTS

| | | |
|---|---|---|
| DE | 197 07 263 A1 | 8/1998 |
| DE | 198 44 663 A1 | 4/2000 |
| JP | 2005/308430 A | 11/2005 |
| WO | 98/37386 | 8/1998 |

OTHER PUBLICATIONS

"Brushless electric motor," Wikipedia.

* cited by examiner

*Primary Examiner* — Jay Patidar
(74) *Attorney, Agent, or Firm* — 24IP Law Group; Timothy R DeWitt

(57) ABSTRACT

A method and an apparatus for determining a rotation angle of a rotor in a motor with the aid of angle sensors by measurement of reference values and correction of the effected computations. The method is used, for example, in a synchronous motor.

10 Claims, 7 Drawing Sheets

APPARATUS AND METHOD FOR DETERMINING A ROTATION ANGLE OF A ROTOR

This application claims priority of German patent application No. 10 2014 115 179.8, filed on 17 Oct. 2014. The entire disclosure of German patent application No. 10 2014 115 179.8 is hereby incorporated herein by reference.

BACKGROUND OF THE INVENTION

Field of the Invention

The present invention relates to a method and an apparatus for computing a rotation angle of a rotor in a motor.

Brief Description of the Related Art

FIG. 5 shows the arrangement of a conventional brushless direct current motor 100. The brushless direct current motor 100 has a rotor 50 that is implemented with a permanent magnet and rotatably held within a stator 80. The stator 80 has a multiplicity of coils 85 controlled by an electronic circuit 90 in order to generate a magnetic field within the stator 80. The rotating field causes a torque on the rotor 50. The commutation of the direct current motor 100, i.e. the switching on and off of the coils 85, is effected via the electronic control 90 and is usually dependent on the rotor position, the rotational speed and the current load of the rotor 50. Angular errors upon measuring the rotor position of the rotor 50 lead to high power dissipation in the direct current motor 10, consequently reducing the available maximal torque. These angular errors are frequently also the causes of noise and vibrations in the direct current motors 100.

For the correct measurement of the rotor position the direct current motors 100 must be calibrated. This calibration is initially effected in a known manner by external sensors, i.e. Hall sensors, placed in the front field of the motor 100 and with a permanent magnet fixed to the rotor 50.

In the state of the art also patent publications are known which disclose sensors for capturing the rotor position in a direct current motor. For example, the Japanese patent application No. JP 2005/308430 of the Matsushita Electric company teaches a contactless detector for the rotation angle which can be used in the direct current motor.

However, these known solutions do not permit a calibration of the sensor during operation. Such a calibration would permit both greater mounting tolerances in the manufacture of the motor and positional changes of the motor or of the sensors during operation. Moreover, an automatic calibration enables a continuous compensation of static and dynamic interference fields in the vicinity of a running motor, which otherwise influence the measurement of the rotation angle.

SUMMARY OF THE INVENTION

A method for determining the rotation angle of a rotor with the aid of sensors in a motor is described. The method comprises the measurement of reference values by reading signal values from the angle sensors after the rotor was brought to a predetermined rotor position. The signal values of a magnetic field are measured during at least one full revolution (360°) of the rotor 50 and offset values of the sensors are computed by forming the average value from the peak values of the magnetic field. A computation of corrected signal values is effected by subtracting the offset values from the measured signal values, and amplitude difference values are computed from the difference of the peak values of the magnetic field. Normalized/standardized signal values and reference values are computed by division in each case of the corrected signal values and reference values with a divisor corresponding to half of the amplitude difference values, and subsequently a correction angle is computed by using the ARCTAN value of the normalized/standardized reference values. The rotation angle is then determined by computing the ARCTAN value of the normalized/standardized amplitude values in the X direction and in the Y direction after deduction of the correction angle.

This method can be effected constantly or continuously, such that an automatic determination of the rotation angle and consequently the calibration of the motor can be effected also during operation.

An apparatus for determining the rotor position of a motor is also described. This apparatus comprises at least one sensor for capturing the magnetic field value and a processor for computing the rotor position for carrying out the method of the invention.

This apparatus and method are used in a synchronous motor having a stator with a plurality of switchable coils and a rotor that is rotatably held in the stator. A permanent magnet is mounted on an axle that is connected to the rotor. This permanent magnet generates the magnetic field used for capturing the rotor position.

For a better understanding of the invention, an exemplary embodiment will now be explained with reference to the following Figures, wherein the invention is not limited to this exemplary embodiment.

BRIEF DESCRIPTION OF THE DRAWINGS

A more complete appreciation of the present invention and many of the attendant advantages thereof will be readily obtained as the same becomes better understood by reference to the following detailed description when considering in connection with the accompanying drawings, wherein.

DESCRIPTION OF THE EMBODIMENTS

Figure 1:
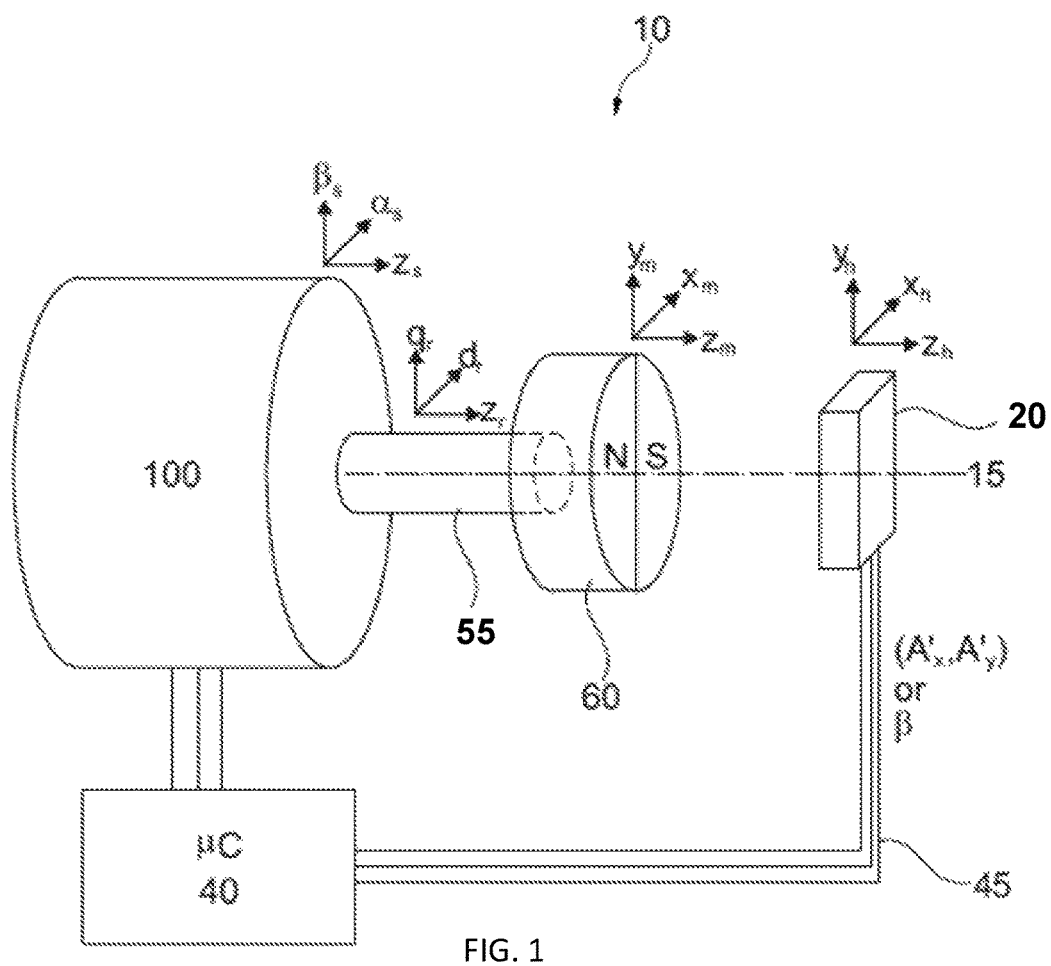
FIG. 1 is the arrangement of a sensor array.

The embodiments will now be described with reference to the accompanying drawings, wherein like reference numerals designate corresponding or identical elements throughout the various drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

FIG. 1 shows the simplified arrangement of a direct current motor 100 having an axle 55 connected to the rotor in the direct current motor 100, and a permanent magnet 60 attached to the front of the axle 55. The permanent magnet 60 in this embodiment has a north pole N and a south pole S. The rotor in the direct current motor 100 rotates about a central axis 15. In the vicinity of the permanent magnet 60 a sensor 20 is attached, which measures the magnetic field B of the permanent magnet 60. The sensor 20 has one or a plurality of two-dimensional or three-dimensional Hall sensors, which can measure the orthogonal values of the magnetic field B in an X direction $X_h$ and in a Y direction $Y_h$ as sensor signals (two-dimensionally) and additionally in a Z direction $Z_h$ (three-dimensionally). The orthogonal values $X_h$ and $Y_h$ are forwarded to a microcontroller 40 via lines 45. The microcontroller 40 is connected to the electronic control 90 of the direct current motor 100 and can switch on and off the activatable coils 85 in the stator 80 of the direct current motor 100.

For a better understanding of the system 100 some coordinate systems are defined which are shown in FIG. 1:
  stator coordinate system (referred to by a character S in subscript);
  rotating rotor coordinate system (referred to by a character R in subscript);
  rotating magnet coordinate system (referred to by a character M in subscript); and
  Hall coordinate system (referred to by a character h in subscript).

Figure 2A:
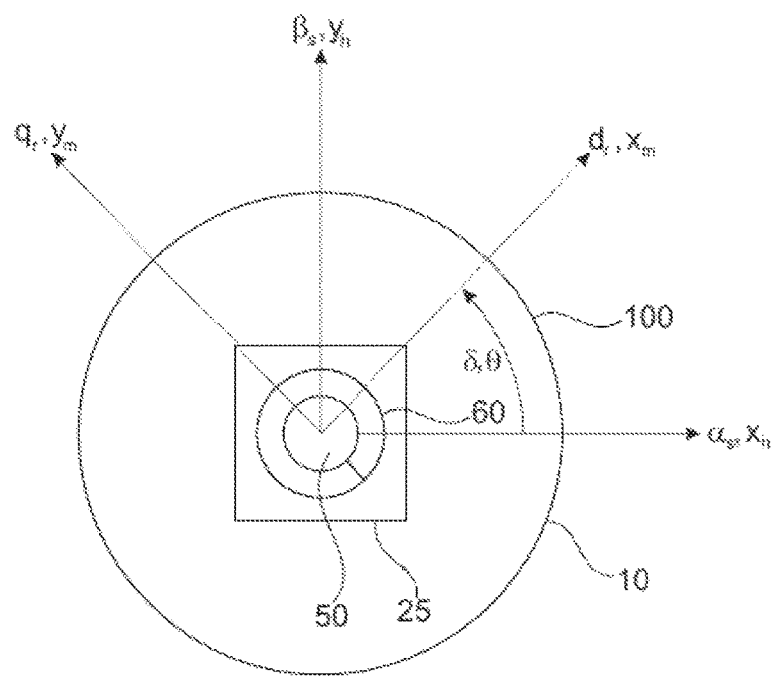
FIGS. 2A and 2B are views along the rotor axle in an optimal arrangement of the sensor array and the curve of the signal values of the sensor.
Figure 2B:
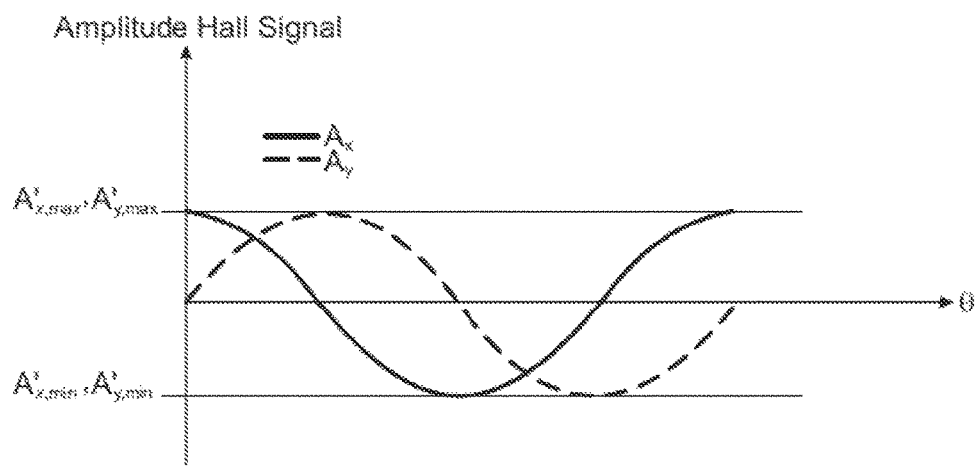

An optimal arrangement of the sensor array 10 is shown in FIG. 2A, which shows the arrangement of the sensor array 10 along the central axis 15. In the arrangement shown in FIG. 2A, the center of the sensor 20 crosses the central axis 15, and the X and Y directions of the stator coordinate system ($X_S$, $Y_S$) are identical to the X and Y directions of the Hall coordinate system ($X_h$, $Y_h$). The magnetic field B has a signal value measured by the sensor 20 in the X direction of $A_x$ and in the Y direction of $A_y$. FIG. 2B shows the curve of the measured signal values $A_x$ and $A_y$ over a full revolution of the rotor 50. In the X direction the measured signal value $A_x$ has a maximal value $A_{x,max}$, which, in this ideal case, is identical to the maximal value of the signal value in the Y direction $A_y$,max. The curves of the signal values $A_x$ and $A_y$ are identical and offset by 90°, since the signal values $A_x$ and $A_y$ are orthogonal. The rotation angle θ of the axle 55 is identical to the measured rotation angle δ of the sensor 20 and is computed with the aid of the arc tangent function as follows:

$$\theta = \delta = \tan^{-1}\left(\frac{A_y}{A_x}\right) \quad (1)$$

Figure 3A:
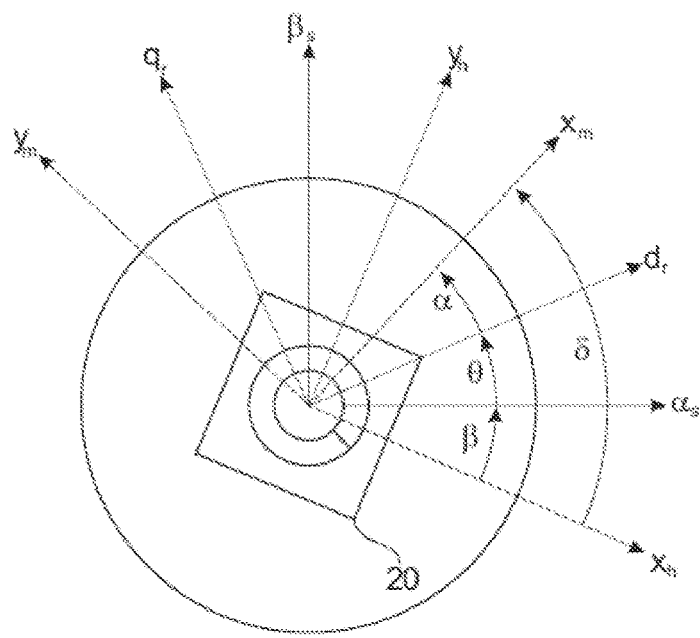
FIG. 3A is a view along the rotor axle with a rotated sensor.
Figure 3B:
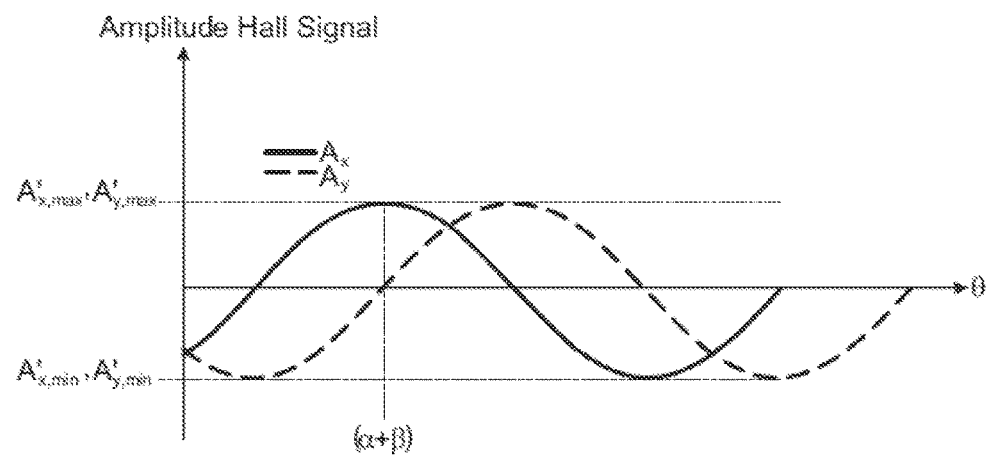
FIG. 3B is a graph of the curve of the signal values of the sensor.

FIG. 3A shows an arrangement of the sensor array 10 in which the center of the sensor 20 still lies in the central axis 15, but the sensor 20 itself and the Hall coordinate system is rotated. In other words, the X and Y directions of the stator 50 and of the sensor 20 are no longer identical. As can be seen from FIG. 3B, the curves of the signal values $A_x$ and $A_y$ measured in each case still have an identical shape in the X direction and the Y direction and are still offset by 90°, since the two directions are orthogonal. The zero point of the signal value in the Y direction $A_y$ is at the angle value α+β, as can be recognized in FIG. 3.

The actual rotation angle θ of the axle 55 is consequently no longer equal to the measured rotation angle δ of the sensor 20, but must be corrected by the factor α+β (correction angle):

$$\theta = \delta - (\alpha + \beta) \quad (2)$$

The rotation angle θ is consequently computed as follows:

$$\theta = \tan^{-1}\left(\frac{A_y}{A_x}\right) - (\alpha + \beta) \quad (3)$$

Figure 4A:
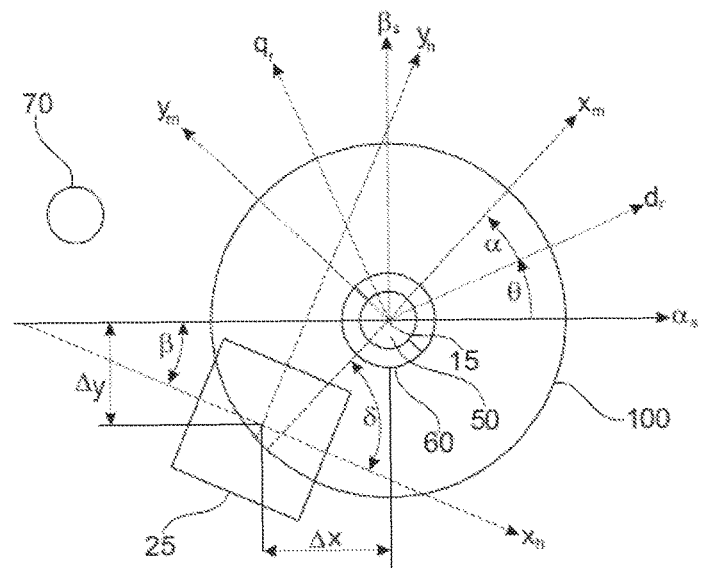
FIG. 4A is a view along the rotor axle with a rotated and offset sensor.

FIG. 4A shows the typical arrangement of the sensor array 10, in which the sensor 20 is rotated about a rotation point and is positioned at a distance (Δx, Δy) from the central axis 15. Moreover, FIG. 4A shows a stray field or interference field caused e.g. by an interfering conductor 70.

Figure 4B:
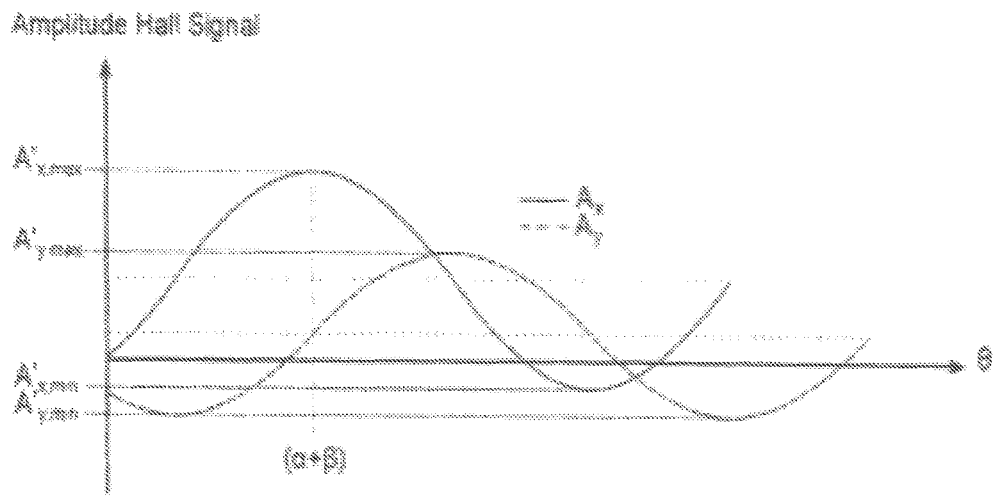
FIG. 4B is a graph of the curve of the measured signal values of the sensor.
Figure 5:
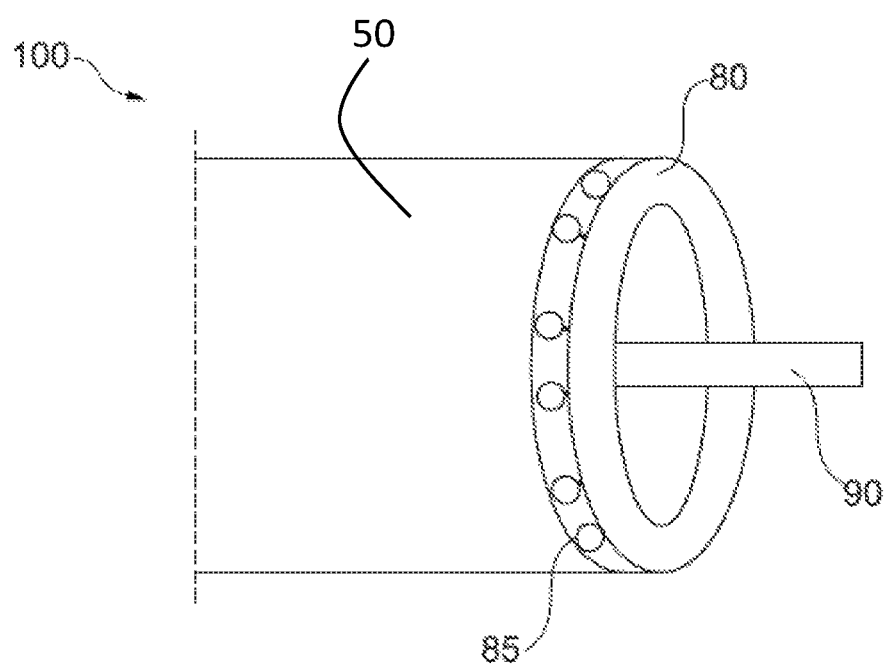
FIG. 5 is a conventional brushless direct current motor.

FIG. 4B shows the curves of the read-out signal values in this case. As can be gathered from FIG. 4B, the curves have a different shape with different maximal values $A_{x,max}$ and $A_{y,max}$ due to the stray field influencing the orthogonal component differently. Likewise, the minimal values of the curves of the orthogonal components $A_{x,min}$ and $A_{y,min}$ have different values. In this case, offset values offx and offy must first be computed in the corresponding X and Y direction for correcting the signal values, before the rotation angle θ of the axle 55 can be computed. These offset values offx and offy are computed by forming the average value of the sum of the maximal and minimal values of the corresponding orthogonal components:

$$\mathit{offx} = \frac{A_{x,max} + A_{x,min}}{2} \quad (4)$$

$$\mathit{offy} = \frac{A_{y,max} + A_{y,min}}{2} \quad (5)$$

The average values of the amplitude difference of the maximal and minimal values ampx in the X direction and ampy in the Y direction are computed according to the following equations:

$$\mathit{ampx} = \frac{A_{x,max} - A_{x,min}}{2} \quad (6)$$

$$\mathit{ampy} = \frac{A_{y,max} - A_{y,min}}{2} \quad (7)$$

The rotation angle θ is now computed from equation 3 as follows, wherein the signal values are corrected by subtracting the corresponding offset values and normalization by the amplitude differences:

$$\theta = \tan^{-1}\left(\frac{A_x - \mathit{offx}}{\mathit{ampx}}, \frac{A_y - \mathit{offy}}{\mathit{ampy}}\right) - (\alpha + \beta) \quad (8)$$

In equation 8 the value of α+β (correction angle) is still unknown. However, this value can be computed from a one-off measurement of the signal values of the orthogonal components $A_{x,ref}$ and $A_{y,ref}$ in the corresponding X and Y directions at a defined rotor position $\theta_{ref}$. From equation 8 the correction angle is then computed:

$$(\alpha + \beta) = \tan^{-1}\left(\frac{A_{x,ref} - offx}{ampx}, \frac{A_{y,ref} - offy}{ampy}\right) - \theta_{ref} \quad (9)$$

Consequently, the rotation angle θ can be computed in any position of the rotor 50 even during ongoing operation by applying the equation 8. The computed values of the rotation angle θ can then be forwarded to the electronic control 90 of the direct current motor 100 in order to control an optimal commutation.

Figure 6:
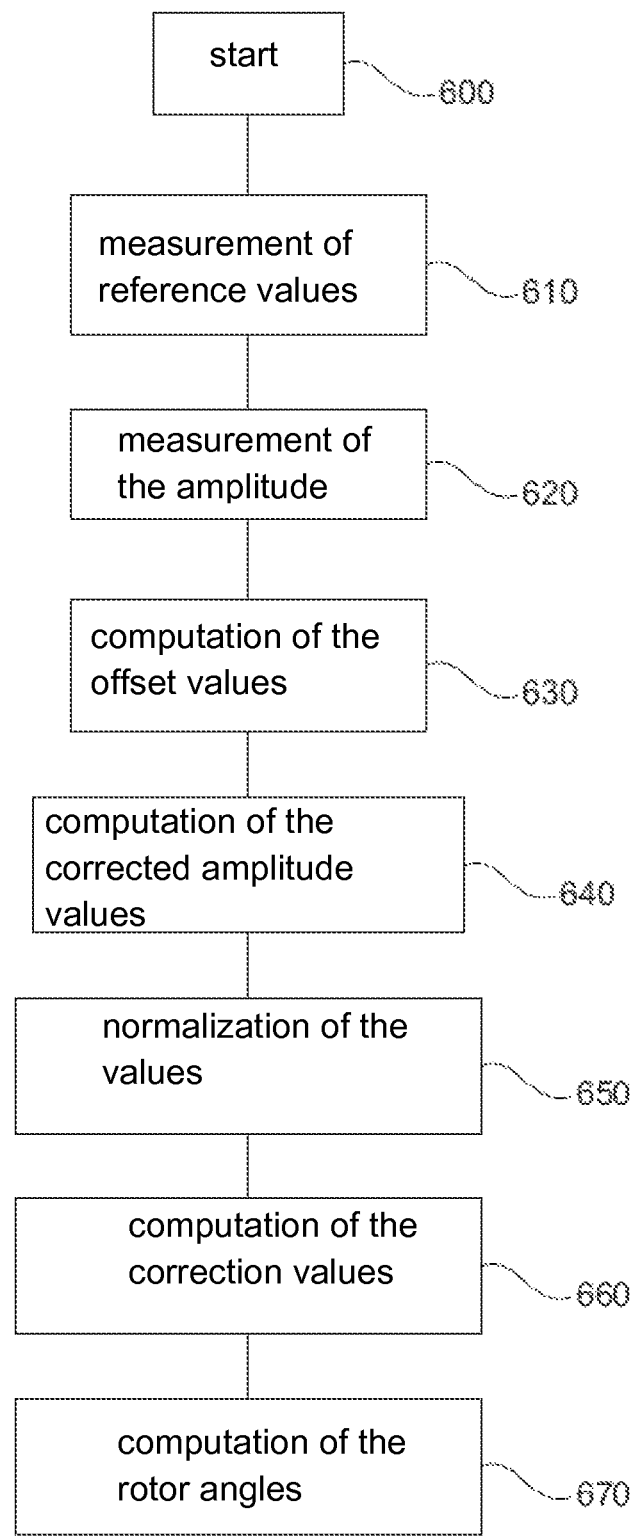
FIG. 6 is the sequence of the method.

FIG. 6 shows the sequence of the method, which starts in step 600. In a first step 610 the orthogonal reference values $A_{x,ref}$ and $A_{y,ref}$ of the Hall signal are read out from the sensor 20 at the known rotation angle $\theta_{ref}$. These reference values $A_{x,ref}$ and $A_{y,ref}$ are used for computing the correction angle α+β later on.

In the subsequent step 620 the orthogonal signal values $A_x$ and $A_y$ are measured over at least one full revolution of the rotor 50, and in step 630 the offset values offx and offy are computed therefrom with the aid of the equations 4 and 5 for the further computation of the corrected signal values. In the step 640 subsequently the amplitude differences ampx and ampy are computed with the aid of the equations 6 and 7. In a further step 650 the corrected signal values $A_x$ and $A_y$ are normalized and the correction angle is computed with the aid of equation 9 in the step 660.

After the computation of the correction angle, the rotor position can be measured at any given time with the aid of equation 8 in step 670.

Figure 7:
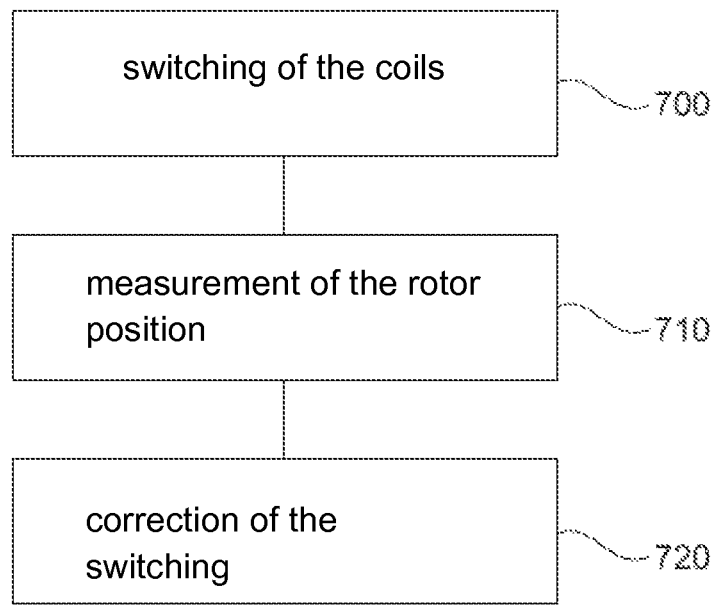
FIG. 7 is a diagram of the method of control of a brushless direct current motor.

In FIG. 7 the control of the brushless direct current motor 100 is explained in simplified fashion. In a first step 700 the coils 85 in the stator 80 are switched suitably in order to generate a rotating field.

During ongoing operation, the rotation angle of the rotor 50 is computed in step 710 with the aid of the method represented in FIG. 6. Further, the parameters ($A_{x,min}$, $A_{x,max}$, $A_{y,min}$, $A_{y,max}$, α+β) required for computing the rotor position are measured red continuously (step 720), and when there exists an excessive, permanent variation, are correspondingly adjusted/recalibrated in order to ensure an efficient control of the motor during ongoing operation.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for determining a rotation angle of a rotor with the aid of angle sensors in a motor, comprising:
   capturing of reference values by reading signal values from the angle sensors after the rotor was brought to a predetermined rotor position;
   measuring amplitude values of a magnetic field during at least one full revolution of the rotor;
   computing offset values of the angle sensors by forming an average value of peak values of the magnetic field;
   computing corrected amplitude values by subtraction of the offset values from the measured amplitude values;
   computing amplitude difference values from the difference of the peak values of the magnetic field;
   computing normalized/standardized amplitude values and of normalized/standardized reference values by division of the corrected amplitude values and the reference values with a divisor, corresponding to the half of the amplitude difference values;
   computing a correction angle by computing the ATAN value of the normalized/standardized reference values; and
   determining the rotation angle by computing the ATAN value of the normalized/standardized amplitude values in the X direction and in the Y direction and deduction of the correction angle.

2. The method according to claim 1, wherein the predetermined rotor position is determined by using the magnetic field.

3. The method according to claim 1, further comprising a constant measurement of the rotation angle.

4. The method according to claim 2, further comprising a constant measurement of the rotation angle.

5. An apparatus for determining the rotor position of a motor, comprising:
   at least one sensor for capturing a magnetic field value; and
   a processor for computing the rotor position, wherein the processor is configured to:
      capture of reference values by reading signal values from angle sensors after the rotor was brought to a predetermined rotor position;
      measure amplitude values of a magnetic field during at least one full revolution of the rotor;
      compute offset values of the angle sensors by forming an average value of peak values of the magnetic field;
      compute corrected amplitude values by subtraction of the offset values from the measured amplitude values;
      compute amplitude difference values from the difference of the peak values of the magnetic field;
      compute normalized/standardized amplitude values and of normalized/standardized reference values by division of the corrected amplitude values and the reference values with a divisor, corresponding to the half of the amplitude difference values;
      compute a correction angle by computing the ATAN value of the normalized/standardized reference values; and
      determine the rotation angle by computing the ATAN value of the normalized/standardized amplitude values in the X direction and in the Y direction and deduction of the correction angle.

6. The apparatus according to claim 5, wherein the processor is further configured to use a value of the magnetic field to determine the predetermined rotor position.

7. The apparatus according to claim 5, wherein the processor is further configured to constantly measure the rotation angle.

8. The apparatus according to claim 6, wherein the processor is further configured to constantly measure the rotation angle.

9. A synchronous motor, comprising:
   a stator with a plurality of switchable coils;

a rotor rotatably held in the stator;
a permanent magnet mounted on an axle connected to the rotor; and
an apparatus for determining the rotor position of a motor, comprising:
- at least one sensor for capturing a magnetic field value; and
- a processor for computing the rotor position configured to:
  - capture of reference values by reading signal values from angle sensors after the rotor was brought to a predetermined rotor position;
  - measure amplitude values of a magnetic field during at least one full revolution of the rotor;
  - compute offset values of the angle sensors by forming an average value of peak values of the magnetic field;
  - compute corrected amplitude values by subtraction of the offset values from the measured amplitude values;
  - compute amplitude difference values from the difference of the peak values of the magnetic field;
  - compute normalized/standardized amplitude values and of normalized/standardized reference values by division of the corrected amplitude values and the reference values with a divisor, corresponding to the half of the amplitude difference values;
  - compute a correction angle by computing the ATAN value of the normalized/standardized reference values; and
  - determine the rotation angle by computing the ATAN value of the normalized/standardized amplitude values in the X direction and in the Y direction and deduction of the correction angle.

10. The synchronous motor according to claim 9, further comprising an electronic circuit for switching the switchable coils on and off.

* * * * *